United States Patent
Tester

(10) Patent No.: US 8,108,143 B1
(45) Date of Patent: Jan. 31, 2012

(54) NAVIGATION SYSTEM ENABLED WIRELESS HEADSET

(75) Inventor: David P. Tester, Swindon (GB)

(73) Assignee: u-blox AG, Thalwil (CH)

(*) Notice: Subject to any disclaimer, the term of this patent is extended or adjusted under 35 U.S.C. 154(b) by 1026 days.

(21) Appl. No.: 11/960,842

(22) Filed: Dec. 20, 2007

(51) Int. Cl.
 *G01C 21/00* (2006.01)
 *H04W 24/00* (2009.01)

(52) U.S. Cl. .................. 701/213; 455/456.1

(58) Field of Classification Search .......... 701/213; 340/539.15, 539.13, 572.1, 538.11, 538.15; 455/456.1–456.3

See application file for complete search history.

(56) References Cited

U.S. PATENT DOCUMENTS

| | | | |
|---|---|---|---|
| 5,365,450 A | 11/1994 | Schuchman et al. | |
| 5,661,460 A | 8/1997 | Sallen et al. | |
| 6,639,516 B1 | 10/2003 | Copley | |
| 6,683,564 B1 | 1/2004 | McBurney | |
| 7,133,685 B2 | 11/2006 | Hose et al. | |
| 7,151,950 B1* | 12/2006 | Oyang et al. | 455/556.1 |
| 7,375,682 B1 | 5/2008 | Tester et al. | |
| 7,460,064 B1* | 12/2008 | Tester et al. | 342/357.51 |
| 7,538,722 B2 | 5/2009 | Thandu et al. | |
| 7,561,101 B1 | 7/2009 | Tester et al. | |
| 7,894,987 B1 | 2/2011 | Tester et al. | |
| 2003/0006931 A1 | 1/2003 | Mages | |
| 2003/0045275 A1* | 3/2003 | McDonagh et al. | 455/414 |
| 2005/0170846 A1* | 8/2005 | Jeon et al. | 455/456.1 |
| 2006/0099969 A1 | 5/2006 | Staton et al. | |
| 2006/0152409 A1 | 7/2006 | Raman et al. | |
| 2007/0042790 A1 | 2/2007 | Mohi et al. | |
| 2007/0057841 A1 | 3/2007 | McBurney et al. | |
| 2007/0118286 A1 | 5/2007 | Wang et al. | |
| 2007/0152876 A1 | 7/2007 | Wang et al. | |
| 2007/0152878 A1 | 7/2007 | Wang et al. | |
| 2007/0237269 A1 | 10/2007 | Lillo et al. | |
| 2008/0104227 A1* | 5/2008 | Birnie et al. | 709/224 |
| 2008/0146890 A1* | 6/2008 | LeBoeuf et al. | 600/300 |
| 2008/0228398 A1* | 9/2008 | Syrjarinne et al. | 701/213 |
| 2009/0018773 A1* | 1/2009 | Niva et al. | 701/300 |
| 2009/0239470 A1* | 9/2009 | Sherman | 455/41.2 |
| 2009/0245167 A1* | 10/2009 | Abraham et al. | 370/316 |
| 2011/0115670 A1* | 5/2011 | Abraham | 342/357.29 |

* cited by examiner

*Primary Examiner* — Isam Alsomiri

(57) ABSTRACT

A method of enabling navigation from a headset is disclosed. The method generally includes the steps of (A) receiving a first signal transmitted by a device to the headset through a wireless personal area network, the first signal carrying assist data transmitted by an Assisted Global Positioning System server, (B) receiving a plurality of navigation signals transmitted by a navigation system to the headset and (C) calculating a current position of the headset at a first time using the assist data to lock onto the navigation signals.

20 Claims, 14 Drawing Sheets

__NAVIGATION SYSTEM ENABLED WIRELESS HEADSET__

CROSS REFERENCE TO RELATED APPLICATIONS

The present application is related to U.S. patent application Ser. No. 11/613,219, filed Dec. 20, 2006, and Ser. No. 11/613,536, filed Dec. 20, 2006, both of which are hereby incorporated by reference in their entirety.

FIELD OF THE INVENTION

The present invention relates to a method and/or architecture for satellite positioning receivers generally and, more particularly, to a navigation system enabled wireless headset.

BACKGROUND OF THE INVENTION

Conventional positioning systems, such as Global Positioning Satellite (GPS) receivers, are increasingly being integrated into battery operated user equipment (i.e., personal digital assistants and cellular telephones). The positioning systems calculate the locations of the user equipment based on signals received from the GPS satellites. The locations are used to provide applications and services for the benefit of the users. Owing to power consumption constraints in battery operated equipment, conventional positioning systems are normally only enabled on demand from the users. Hence, the applications and services can only be delivered following explicit requests from the users to establish current locations. As such, some applications and services will not function as intended where the users do not request location updates for an extended time. Therefore, a challenge in conventional implementations is to acquire the position fix as quickly as possible to minimize any delay in the response of location-based applications and services.

SUMMARY OF THE INVENTION

The present invention concerns a method of enabling navigation from a headset. The method generally comprises the steps of (A) receiving a first signal transmitted by a device to the headset through a wireless personal area network, the first signal carrying assist data transmitted by an Assisted Global Positioning System server, (B) receiving a plurality of navigation signals transmitted by a navigation system to the headset and (C) calculating a current position of the headset at a first time using the assist data to lock onto the navigation signals.

The objects, features and advantages of the present invention include providing a navigation system enabled wireless headset that may (i) transfer Assisted GPS (A-GPS) data via a Bluetooth® channel to a headset, (ii) provide a short time to first fix, (iii) repeatedly report the current position to location-based services and/or (iv) merge the circuitry of a Bluetooth® receiver and a GPS location receiver in the headset.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
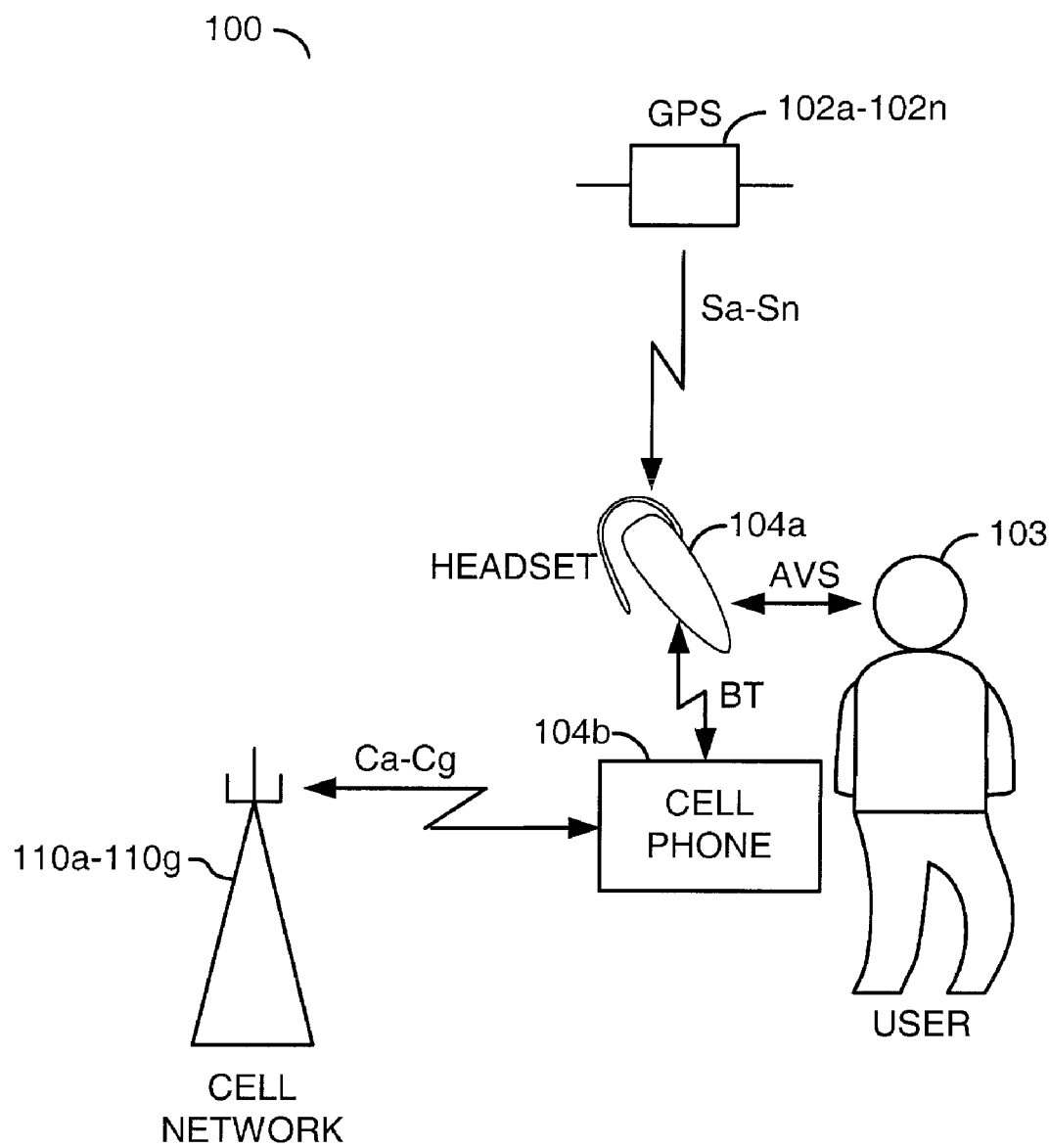
FIG. 1 is a diagram of a system in accordance with a preferred embodiment of the present invention.

The present invention generally concerns an architecture of a satellite positioning receiver optimized for use in a Bluetooth® headset used in conjunction with a cellular telephone and other portable devices capable of receiving data from a cellular network. Bluetooth® is a registered trademark of the Bluetooth Special Interest Group, Inc., Bellevue, Wash. The satellite positioning receivers may include devices or systems that calculate the position of a user from signals received from navigation satellites, and in particular to receivers integrated into battery operated, mobile headsets often using a personal area network wireless protocol to communicate with a cell phone receiver.

The headset/receiver combination may exploit a physical distance away from the cell phone to minimize interference with other radio technologies (e.g., cellular radio, Wi-Fi radio, digital TV radio and digital radio) that may exist within the cell phone. The satellite positioning receiver may also exploit being located in the headset (next to the user's ear) to maximize a strength of the received satellite signals. The satellite positioning receiver generally utilizes Assisted Global Positioning System (A-GPS) information transmitted on many cell phone networks to reduce a Time To First Fix (TTFF), receiver sensitivity and/or other common satellite receiver performance parameters.

The A-GPS information may be sourced either from an A-GPS infrastructure embedded within the cell phone network or from GPS aiding equipment that may not be part of the cell phone network, but transmits the aiding information over the various data channels (e.g., GPRS, 3G, etc.) provided by the cellular telephone network. The assistance information may be available for some (or all) of the various positioning signals transmitted by the Global Positioning System (GPS) or GLObal NAvigation Satellite System (GLONASS) systems. The same techniques may be appropriate for use in the future with the Galileo and/or Beidou satellite positioning systems when operational. Furthermore, the same or similar techniques would be appropriate for geostationary extensions to GPS, GLONASS or Galileo, such as the European Geostationary Navigation Overlay Service (EGNOS) and the Wide Area Augmentation System (WAAS).

The cellular telephone network may make the A-GPS information available to the cell phone via standardized cell phone protocols, such as IS-801, GSM, W-CDMA, 3GPP and 3GPP2. The satellite positioning assistance information is generally extracted from the cellular telephone network transmission by equipment in the cell phone and communicated to the headset via a wireless communication link. A-GPS data may include ephemeris data of the satellites, an almanac of the satellites, a coarse position of the cell phone, a local time at the cell phone, satellite health information and satellite status information. Many aspects of GPS receiver performance, such as TTFF and acquisition sensitivity may be enhanced through the availability of A-GPS assistance information. A headset with an embedded GPS receiver may use the A-GPS information to optimize overall system performance.

Referring to FIG. 1, a diagram of a system 100 is shown in accordance with a preferred embodiment of the present invention. The system 100 generally comprises multiple (e.g., 24 to 30) navigation satellites 102a-102n, a device (or apparatus) 104a, a device (or apparatus) 104b, a user 103 and one or more wireless cellular networks 110a-110g. A wireless cellular telephone system may be formed by the device 104a in communication with the device 104b. The device 104a may include an embedded (or integrated) positioning system receiver (e.g., a GPS receiver).

Multiple signals (e.g., Ca-Cg) may be transmitted from the cellular network towers 110a-110g to the device 104b. A bidirectional signal (e.g., BT) may be transferred between the device 104a and the device 104b. In some embodiments, the signal BT may be implemented as a Bluetooth® signal.

The device 104a may receive signals (e.g., Sa-Sn) from the navigation satellites 102a-102n. In some embodiments, the navigation satellites 102a-102n may be part of the GPS constellation. In other embodiments, the satellites 102a-102n may be part of GLONASS. Other space-based positioning systems, such as the proposed Galileo project, may be used as the source of the signals Sa-Sn.

A bidirectional signal (e.g., AVS) may be transferred between the device 104a and the user 103. The signal AVS generally comprises one or more audio signals, one or more visual signals and/or one or more tactile signals (e.g., vibrations) perceivable by the user 103.

The device 104b is generally implemented as a cellular telephone with a wireless headset capability. The device 104b may also be implemented as a variety of items, such as a personal digital assistant (PDA), a laptop computer, a digital camera with built-in GPS and/or other battery powered equipment capable of communicating with one or more cellular networks. The device 104b is generally operational to (i) provide cellular telephone services to the user 103 and (ii) provide location-based applications and/or services to the user 103. The device 104b may be further operational to (i) both transmit and receive voice data to and from the cell network towers 110a-110g via one or more signal Ca-Cg and (ii) receive data from one or more of the cell network towers 110a-110g via one or more signals Ca-Cg. Data received from the cell network towers 110a-110g may include, but is not limited to, A-GPS data, a local time and coarse location information. The device 104b may also be operational to (i) both transmit and receive voice data to and from the device 104a via the signal BT and (ii) both transmit and receive navigation-related data to and from the device 104a via the signal BT. Transmitted navigation-related data sent to the device 104a may include, but is not limited to, the A-GPS data, the local time, the coarse location and one or more update requests. Received navigation-related data coming from the device 104a may include, but is not limited to, a device position, a device velocity and a current (GPS) time.

The device 104a may be implemented as a handheld (or portable) cell phone headset with an embedded navigation receiver. The device 104a may also be implemented as a heads-up display and/or other battery powered human-machine interface equipment capable of communicating with the device 104b over the personal area network. The device 104a may be operational to (i) provide voice messages to and from the user 103 in support of the cellular telephone capability of the device 104b and (ii) provide device position, device velocity and current (GPS) time to the device 104b in support of the location-based services operating in the device 104b.

The cellular network towers 110a-110g may be operational to provide cellular telephone services to the system 104a-104b. In some cases, the cellular network towers 110a-110g may also provide data services to the device 104b. For example, each of the cellular network towers 110a-110g may transmit A-GPS data, a local time and an approximate (or coarse) position around a local cellular coverage area to the device 104b. The coarse position may be based on (i) an identification of a particular cell and/or (ii) triangulation to several cells.

Figure 2:
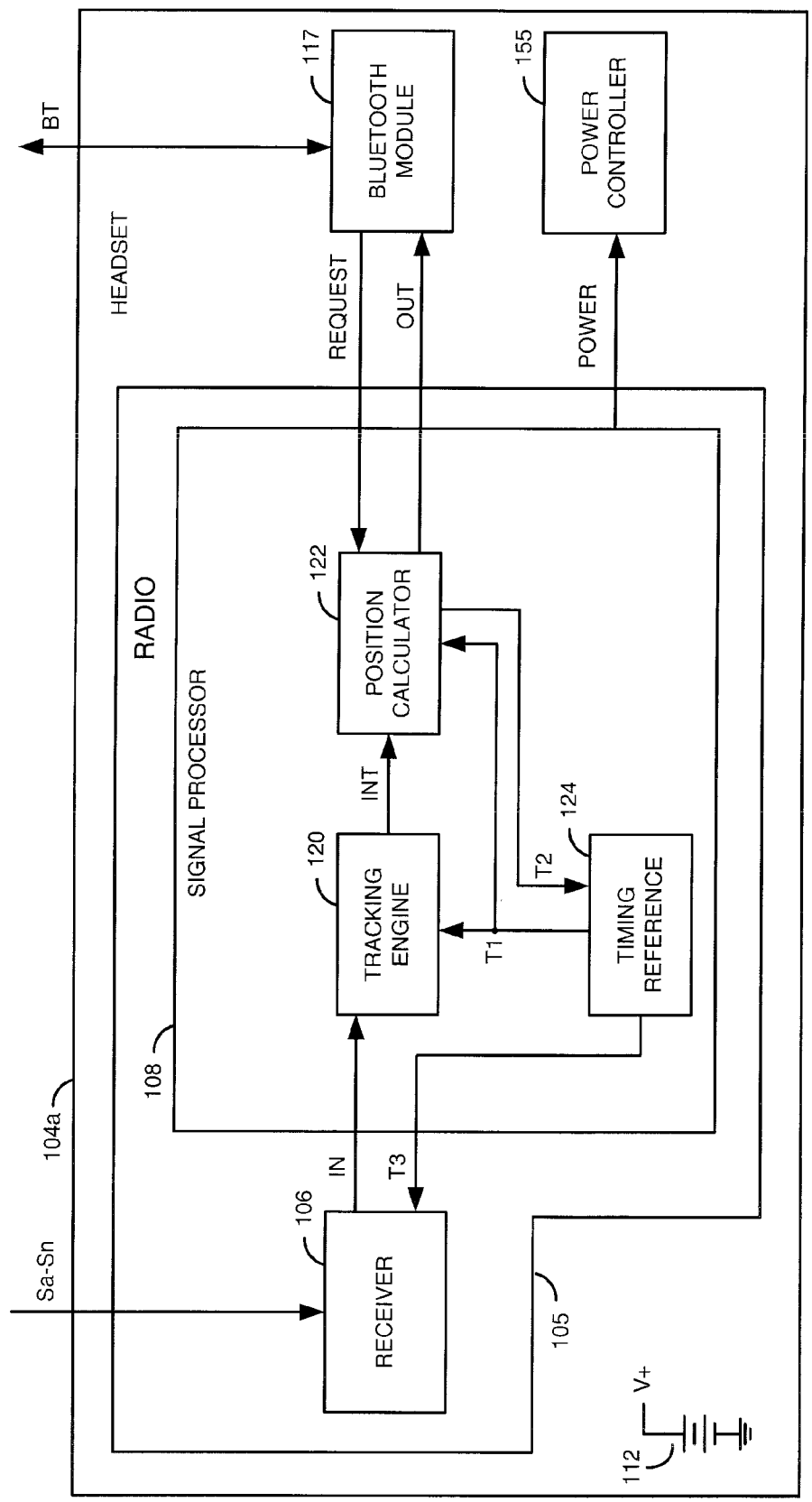
FIG. 2 is a block diagram of an example implementation of a headset of the system.

Referring to FIG. 2, a block diagram of an example implementation of the device 104a is shown. The device 104a generally comprises a circuit (or module) 106, a circuit (or module) 108 a circuit (or module) 112, a circuit (or module) 117 and a circuit (or module) 155. A combination of the circuit 106, the circuit 108 and optionally the circuit 155 may form a satellite receiver circuit (or module) 105.

The signals Sa-Sn may be received by the circuit 106. An input signal (e.g., IN) may be generated by the circuit 106 and presented to the circuit 108. The circuit 108 may generate a timing signal (e.g., T3) that is transferred back to the circuit 106. An output signal (e.g., OUT) may be generated by the circuit 108 and presented to a circuit 117. The circuit 117 may generate and present a request signal (e.g., REQUEST) to the circuit 108. The signal BT may be received by the circuit 117. A signal (e.g., POWER) may be generated by the circuit 108 and presented to the circuit 155.

The circuit 106 may be implemented as a radio front-end receiver (or radio). The circuit 106 may be operational to listen to the viewable satellites 102a-102n through the signals Sa-Sn and appropriate earth-based transmission, if implemented. Operationally, the circuit 106 may down-convert and digitize the available signals Sa-Sn to generate the signal IN.

The circuit 108 may be implemented as a signal processor circuit. The circuit 108 is generally operational to calculate the device position and the device velocity based on the information received in the signal IN. Furthermore, the circuit 108 may maintain a current time for the device 104a. Timing related information may be presented from the circuit 108 to the circuit 106 in the signal T3. Some or all of the device position, the device velocity and the current time may be presented from the circuit 108 to the circuit 117 in the signal OUT either periodically, aperiodically and/or on demand in response to a request made by assertion of the signal REQUEST. For example, an application (e.g., a cellular telephone function) in the device 104b may be configured to request a current location update periodically (e.g., every 20 seconds) through the circuit 117. If an update is missed for some reason, the circuit 108 may wait a short time (e.g., 5 seconds) and then deliver the updated location measurement.

The circuit 112 may be implemented as one or more batteries. The circuit 112 generally provides electrical power to all of the other circuits within the device 104a. The batteries may be implemented as replaceable batteries and/or rechargeable batteries. Other power sources may be implemented to meet the criteria of a particular application.

The circuit 117 generally implements a personal area network transceiver (or radio). The circuit 117 may be operational to transfer commands and data between the device 104a and the device 104b via the signal BT. In some embodiments, the personal area network may be a Bluetooth® network. Other networks may be implemented to meet the criteria of a particular application.

The circuit 155 may be implemented as a power control circuit. The circuit 155 is generally controlling the power consumption of the circuit 108 and the circuit 106 based on data received in the signal POWER. Power control may include, but is not limited to, application/removal of electrical power, timing of software execution and/or increasing/decreasing clock speeds. The circuit 155 generally allows the device 104a to conserve the batteries 112 by (i) reducing electrical power consumption while navigation tasks are not in use and (ii) minimizing the power consumption when the navigation tasks are in use.

Referring still to FIG. 2, the circuit 108 generally comprises a circuit (or module) 120, a circuit (or module) 122 and a circuit (or module) 124. The signal IN may be received by the circuit 120. An intermediate signal (e.g., INT) may be generated by the circuit 120 and presented to the circuit 122. The circuit 122 may generate the signal OUT and receive the signal REQUEST. A timing signal (e.g., T1) may be generated by the circuit 124 and presented to both the circuit 120 and the circuit 122. A timing update signal (e.g., T2) may be generated by the circuit 122 and presented to the circuit 124. The circuit 124 may also generate the signal T3.

The circuit 120 may be implemented as a tracking engine. The circuit 120 may be operational to search for the different satellites 102a-102n that may be in view of the circuit 106. Searching is generally conducted across a frequency range to compensate for Doppler frequency shifts in the signals Sa-Sn caused by the relative motion of the device 104a and the satellites 102a-102n. The searching may also be conducted in a window of time to find the correct positions of pseudo-random code sequences in the signals Sa-Sn. Conclusions from the pseudo-random code sequence searches generally give first approximations for a user time bias, reference epoch and a distance from the device 104a to respective satellites 102a-102n. The approximate distances are generally called pseudo-ranges.

Since the circuit 120 is effectively "always on", the circuit 120 generally has knowledge a priori of which satellites 102a-102n are in view. The circuit 120 may also have a good estimate of the satellite positions and the satellite velocities relative to the device 104a. A good estimate of the resulting Doppler shifts may be calculated based on the estimated satellite positions and the estimated satellite velocities. Furthermore, the circuit 106 is generally aware of a local frequency reference that is (i) drifting relative to an absolute time (e.g., GPS time) and (ii) has an absolute frequency error. The device 104a may also generate a good estimate of the device position and the device velocity. From the device position, the device velocity and the absolute frequency error, the circuit 120 may estimate the proper positions of the pseudo-random code sequences in the signals Sa-Sn transmitted from the available satellites 102a-102n. A result is generally a reduction in the searching performed while calculating the pseudo-range to each of the satellites 102a-102n and hence a corresponding reduction in the power consumed in performing the calculations.

The circuit 122 may be implemented as a position calculator. The circuit 122 generally uses the pseudo-ranges to the several satellites 102a-102n, information regarding the Doppler shifts, knowledge of the satellite positions and knowledge of the satellite trajectories to calculate the device position and the device velocity of the device 104a. Operations within the circuit 122 may be simplified by estimating the current device position and the current device velocity from knowledge of one or more previously calculated device positions and one or more previously calculated device velocities. In turn, the simplifications may result in a reduced power consumption.

The circuit 124 may be implemented as a timing reference circuit. The circuit 124 may be used to generate a current local time in the signal T1. Corrections to the current time may be made based on satellite timing information received from the circuit 122 in the signal T2. Timing information for the circuit 106 may be generated in the signal T3.

From time to time, the signals Sa-Sn from the satellites 102a-102n may not be clearly visible from the receiver 106. For example, signal degradation or signal loss may happen when the user takes the device 104a deep inside a building. Signal loss may also happen as part of a deliberate strategy to shut down the circuit 106 for short periods to save power.

During periods of signal-loss and/or weak signals Sa-Sn, the circuit 124 generally assures that an accurate timing reference is maintained. For example, under weak signal conditions, the circuit 108 may integrate over multiple navigation bits (e.g., 20 millisecond periods) and use data wipe-off to allow coherent integration. Knowledge of how good or bad the local time base/reference frequency actually is generally provides an upper bound on the number of pseudo-random noise spreading chips to be searched in order to reacquire the GPS signals.

When the signal conditions improve and/or return to normal, the "always-on" circuit 120 may rapidly reacquire a new position lock by accurately knowing the elapsed time since the last position fix, the user time bias and both the absolute error and the drift error of the local frequency reference. In such a case, the new positions of the satellites, the Doppler shifts and the positions in the pseudo-random code sequences may be accurately estimated by the circuit 120. Thereafter, re-acquisition of the satellites 102a-102n may utilize modest calculations and power.

Figure 3:
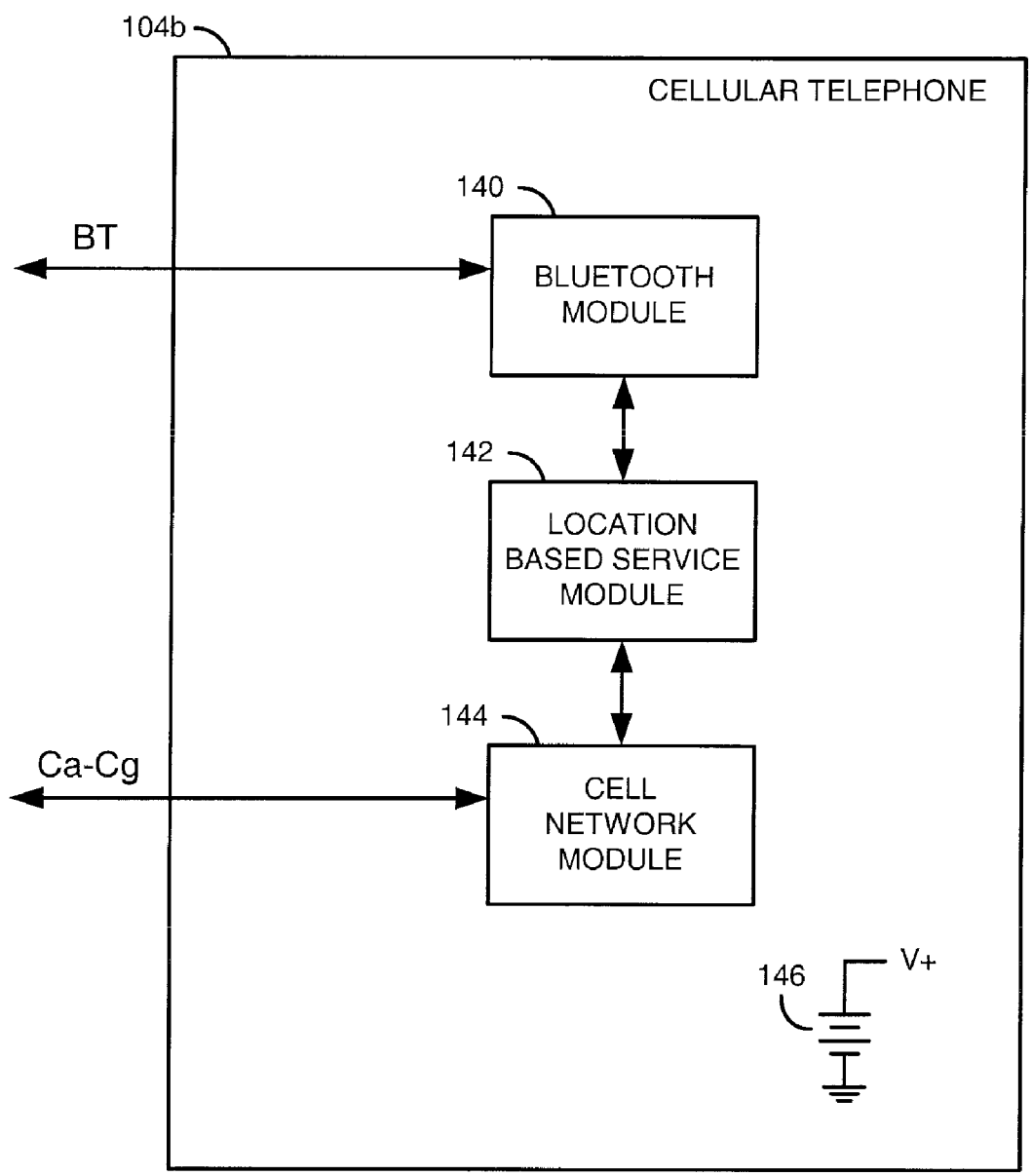
FIG. 3 is a block diagram of an example implementation of a cellular telephone of the system.

Referring to FIG. 3, a block diagram of an example implementation of the device 104b is shown. The device 104b generally comprises a circuit (or module) 140, a circuit (or module) 142, a circuit (or module) 144 and a circuit (or module) 146. The signals Ca-Cg may be transmitted and received from the circuit 144. The signal ET may be transmitted and received from the circuit 140.

The circuit 140 generally implements a personal area network transceiver (or radio). The circuit 140 may be configured and operational to communicate with the circuit 117 in the device 104a. Local bidirectional communications may also be established (i) between the circuit 140 and the circuit 142 and (ii) between the circuit 142 and the circuit 144. Communications between the circuit 140 and the circuit 142 may include, but are not limited to, the current position requests sent to the device 104a, the position received from the device 104a, the velocity received from the device 104a, the current time received from the device 104a, the A-GPS information sent to the device 104a, the local time sent to the device 104a, the coarse position sent to the device 104a, voice data sent to the device 104a and voice data received from the device 104a.

The circuit 142 may be implemented as one or more processors executing one or more applications (e.g., software modules). The circuit 142 may be operational to utilize the device position, the device velocity, the current time from the device 104a, the local time from the cellular network and/or the coarse position derived from the cell towers 110a-110g to provide location-based services and/or benefits to the user 103. Examples of the location-based services may include, but are not limited to, localized advertising, public service information, weather, traffic conditions, business hours, directions, proximity alarms, games and other applications/ services that depend on the user's location.

The circuit 142 may include a cellular telephone capability. When present, the cellular telephone capability may include transferring voice data to and from the circuit 144 to facilitate communications over the cellular network. The cellular telephone capability may also receive an interrupt when a new user location has been either measured or estimated by the device 104a. In some embodiments, the interrupt and new user location may be used to provide a location-based personalization of the phone application (e.g., automatically adjust the ring tone based on location).

Furthermore, the bidirectional communication link with the circuit 144 may enable various information requests to be initiated by the circuit 142, passed through the circuit 144 and relayed to the cellular network. The cellular network may respond by returning the requested information to circuit 142 through the circuit 144. Other information, such as the local time and local position based on cell tower identification, may be transmitted to the circuit 142 through the circuit 144 on a repeated basis.

The circuit 144 generally implements a cellular network transceiver (or radio). The circuit 144 may be operational to send and receive voice, data and other information to and from the cell network towers 110a-110g via the signals Ca-Cg. The circuit 144 may be further operational to determine an approximate position of the device 104b by triangulation using several of the signals Ca-Cg.

The circuit 146 may be implemented as one or more batteries. The circuit 146 generally provides electrical power to all of the other circuits within the device 104b. The batteries may be implemented as replaceable batteries and/or rechargeable batteries. Other power sources may be implemented to meet the criteria of a particular application.

Figure 4:
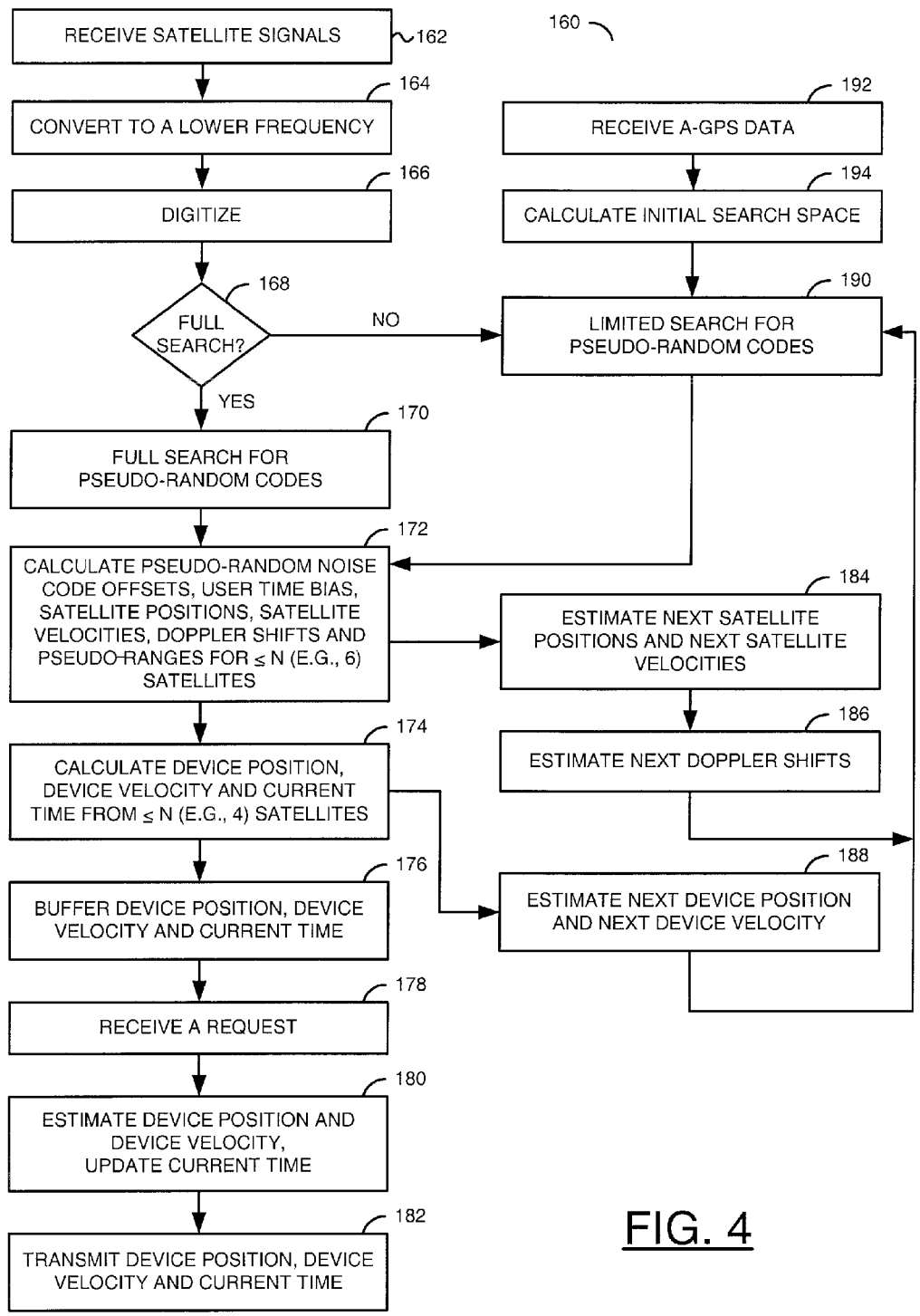
FIG. 4 is a flow diagram of an example positioning process.

Referring to FIG. 4, a flow diagram of an example positioning method 160 performed by the device 104a is shown. The method (or process) 160 may be implemented as a satellite positioning operation. The method 160 generally comprises a step (or block) 162, a step (or block) 164, a step (or block) 166, a step (or block) 168, a step (or block) 170, a step (or block) 172, a step (or block) 174, a step (or block) 176, a step (or block) 178, a step (or block) 180, a step (or block) 182, a step (or block) 184, a step (or block) 186, a step (or block) 188, a step (or block) 190, a step (or block) 192 and a step (or block) 194.

In the step 162, the circuit 106 may receive one or more of the signals Sa-Sn. The received signals Sa-Sn may be frequency converted to the intermediate frequency or a baseband frequency in the step 164. The resulting signal may then be digitized in the step 166 to create the signal IN.

If the signal IN contains an initial set of data from the satellites 102a-102n, a full search for the pseudo-random codes may be performed by the circuit 120 (e.g., the YES branch of the step 168). In the step 170, the circuit 120 may search in both frequency and in time for the pseudo-random codes received in the signal IN. The search may be limited to the strongest signals. Satellites known to be well below the horizon may be eliminated from the search.

Once the pseudo-random codes have been identified, a correlation peak from a prompting correlator may be examined to estimate the signal energy. If a sub-chip time offset exists in the locally generated pseudo-random noise code, a local reference frequency error (e.g., due to a Doppler shift) may be corrected. The circuit 120 may then calculate the satellite positions, the satellite velocities and the Doppler shift information in the step 172. The pseudo-ranges and associated Doppler shift information may be presented to the circuit 122 in the signal INT. To conserve power, the calculations may be (i) limited to a restricted number of satellites (e.g., at most six satellites), (ii) performed periodically (e.g., once every 15 second to 30 seconds), (iii) performed aperiodically and/or (iv) performed on demand.

In the step 174, the circuit 122 may calculate the position of the device, the velocity of the device 104a and a "GPS time" (e.g., 14 seconds different from Universal Time as of Jan. 1, 2006). The user time bias from the GPS time may be presented to the circuit 124 in the signal T2. The calculations are generally based on the pseudo-ranges and the Doppler shift information received in the signal INT. The current time may also be presented to the circuit 122 via the signal T1. Once calculated, the device position, the device velocity and the current time may be buffered by the circuit 122 in the step 176.

To save power, the calculations may be limited to a restricted number of satellites. Generally, the circuit 122 may calculate a Geometric Dilution Of Precision (GDOP) for all of the satellites 102a-120n that may be visible. A combination of the satellites 102a-102n (e.g., at most four) that gives a best dilution of precision metric may be used by the circuit 122. In contrast, a typical position-velocity calculation takes into account 6 to 12 of the satellites 102a-102n.

The circuit 142 may send a request to the circuit 122 for one or more of (i) the device position, (ii) the device velocity and (iii) the current time via the signal REQUEST in the step 178. The circuit 122 may respond to the request by estimating the device position and/or the device velocity at the time of the request based on prior device positions and/or prior device velocities in the step 180. The circuit 122 may also update the current time in the step 180 for presentation in the signal OUT. In the step 182, the circuit 117 may transmit the requested device position, device velocity and/or current time to the device 104b.

During subsequent sets of searches and calculations for the signal IN, the circuit 108 may use prior knowledge of the satellite positions, the satellite velocities, the device position, the device velocity and the current time to simplify the workload. In the step 184, the circuit 120 may estimate the next satellite positions and the next satellite velocities. Thereafter, the circuit 120 may estimate the next expected Doppler shifts of the satellites 102a-102n in the step 186. Likewise, the circuit 122 may calculate a next device position and a next device velocity in the step 188. A combination of the estimated satellite positions, satellite velocities, Doppler shifts, device position and device velocity may be used in the circuit 120 to perform a limited search of the next set of pseudo-random codes in the step 190. Once the pseudo-random codes have been found, the circuit 120 may continue calculating the actual satellite positions, the actual satellite velocities and the actual Doppler shift information as before in the step 172.

If the device 104a has been powered down for an extended period (e.g., the user turns off the headset while sleeping), the circuit 108 may utilize the A-GPS data to quickly reacquire lock on the satellites 102a-102n. In the step 190 the circuit 117 may receive the A-GPS data from the device 104b and then pass the A-GPS data along to the circuit 108. The circuit 108 may use the A-GPS data in the step 194 to calculate an initial search space to be used in reacquiring the signals Sa-Sn. Thereafter, the circuit 108 may perform the limited search of the step 190 to rapidly reacquire lock on the signals Sa-Sn. The rapid re-acquisition may provide compliance with the Enhanced 911 (E911) mandate of the Federal Communications Commission in North America and/or F112 currently being deployed in Europe to give emergency call dispatchers the position of the calling cell phone.

Figure 5:
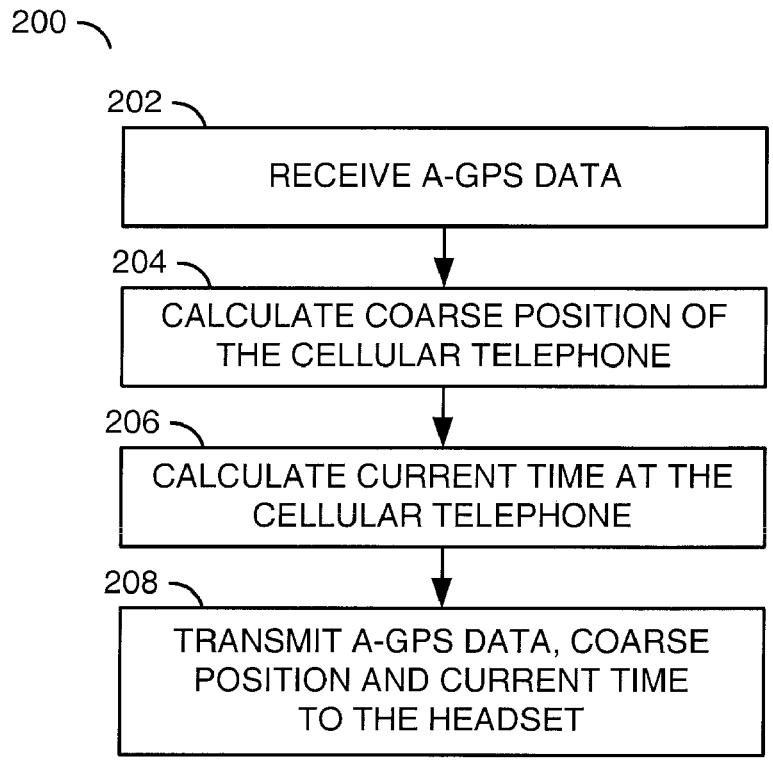
FIG. 5 is a flow diagram of an example assist data transfer process.

Referring to FIG. 5, a flow diagram of an example assist data transfer method 200 is shown. The transfer method (or process) 200 may be implemented in the device 104a. The method 200 generally comprises a step (or block) 202, a step (or block) 204, a step (or block) 206 and a step (or block) 208.

In the step 202, the circuit 144 may receive the A-GPS data through one or more of the signals Ca-Cg. Either the circuit 144 and/or the circuit 142 may calculate a coarse position of the device 104b in the step 204. The calculations of the coarse position may be based on an identification of a signal from a specific cell network tower 110a-110g having a predetermined location, triangulation using several of the signals Ca-Cg and/or other processes presently available to cell phones. In some embodiments, the coarse position may be calculated within the cellular network and transmitted to the device 104b.

In the step 206, either the circuit 144 and/or the circuit 142 may calculate the local time based on time information received in the signals Ca-Cg (e.g., embedded within the A-GPS data carried by the signals Ca-Cg). In some embodiments, the local time may be kept within the cellular network and transmitted to the device 104b. The circuit 140 may transmit the A-GPS data (e.g., ephemeris, almanac, coarse position, local time, satellite health and satellite status) to the device 104a in the step 208. The device 104a may then use the A-GPS data to quickly reacquire track of the signals Sa-Sn (see FIG. 4)

Figure 6:
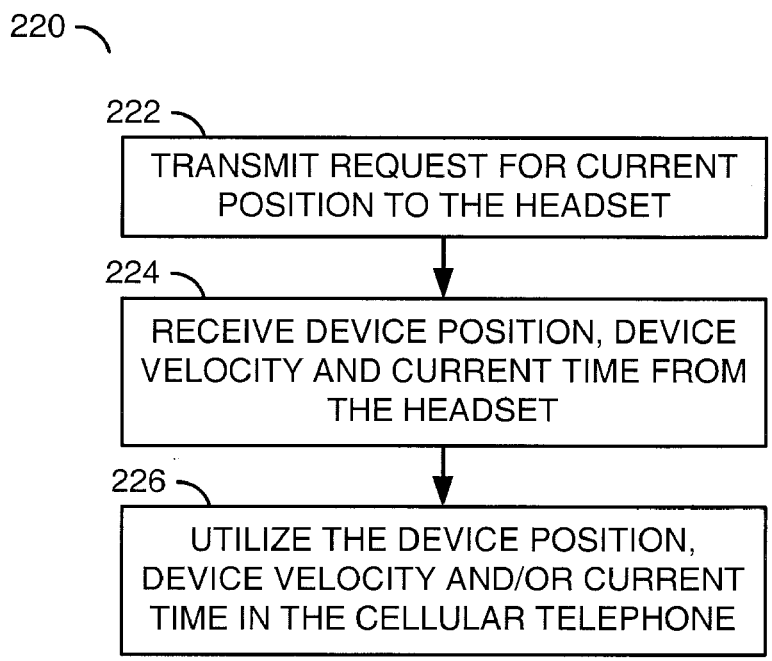
FIG. 6 is a flow diagram of an example location-based service process.

Referring to FIG. 6, a flow diagram of an example location-based service method 220 is shown. The method (or process) 220 may be implemented in the device 104b. The method 220 generally comprises a step (or block) 222, a step (or block) 224 and a step (or block) 226.

The circuit 142 generally hosts one or more location-based services that may rely on knowing the current position of the user 103. As such, a request for the current position may be generated by the circuit 142 and transmitted to the device 104a via the signal BT in the step 222. The circuit 122 may respond to the request by supplying the device position, the device velocity and/or the current (GPS) time back to the device 104b. As noted above, the current device position, velocity and time may be data points calculated from the signals Sa-Sn and/or extrapolations from previously calculated points. The circuit 140 may receive the device position, velocity and/or time from the device 104a via the signal BT in the step 224. In the step 226, the circuit 142 may utilize the device position, the device velocity and/or the current time to provide the location-based service to the user 103.

Figure 7:
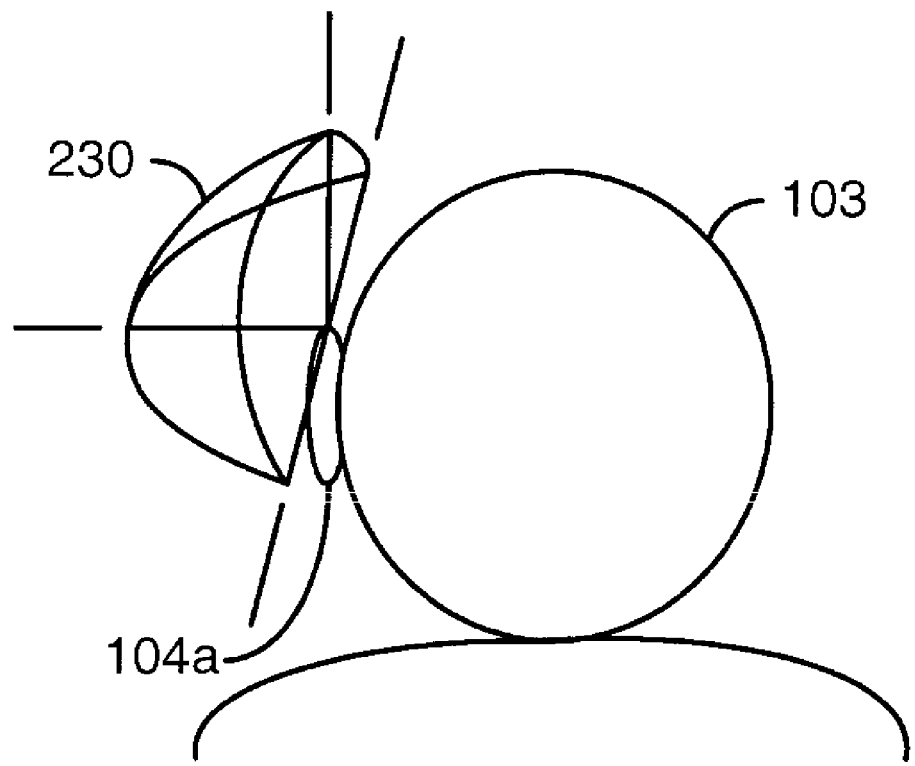
FIG. 7 is a diagram illustrating a user wearing the headset.

Referring to FIG. 7, a diagram illustrating a user wearing a headset is shown. The physical location of the satellite positioning receiver within the headset device 104a generally provides opportunities to improve overall system performance of the satellite positioning receiver. The physical orientation of the satellite positioning receiver (when the user 103 is making/receiving a cell phone call) is usually known since the device 104a is commonly attached to an ear of the user 103. An increasingly common practice is for the user 103 to wear the device 104a on the ear even when not actively making phone calls.

The orientation of the satellite antenna when the device 104a is attached to the user's ear is generally known. In particular, the physical positioning and orientation of the device 104a while worn is deterministic. Hence the physical location of the satellite antenna within the device 104a is also known. The known orientation of the device 104a on the ear may ensure that the satellite antenna is positioned in such a way within the device 104a to be exposed to the sky and pointing toward the satellites 102a-102n during normal use. Optimal orientation of the satellite antenna generally has a positive effect on overall satellite navigation receiver performance.

As illustrated in FIG. 7, the device 104a may be positioned on the right ear of the user 103. In some applications, the device 104b may be worn on the left ear. In other applications, the device 104a may be worn on both ears, one ear at a time or both ears simultaneously. With the satellite antenna mounted high on the user 103 (e.g., as compared with a pant pocket or purse), a wide view of the sky may be available to listen for the satellites 102a-102n. In particular, the satellite antenna may be blocked by the ground from the satellites 102a-102n below the horizon and partially blocked by the user's head, but otherwise, the satellite antenna may have a clear field of view in all other directions (e.g., at least a quarter-sphere field of view 230).

Figure 8:
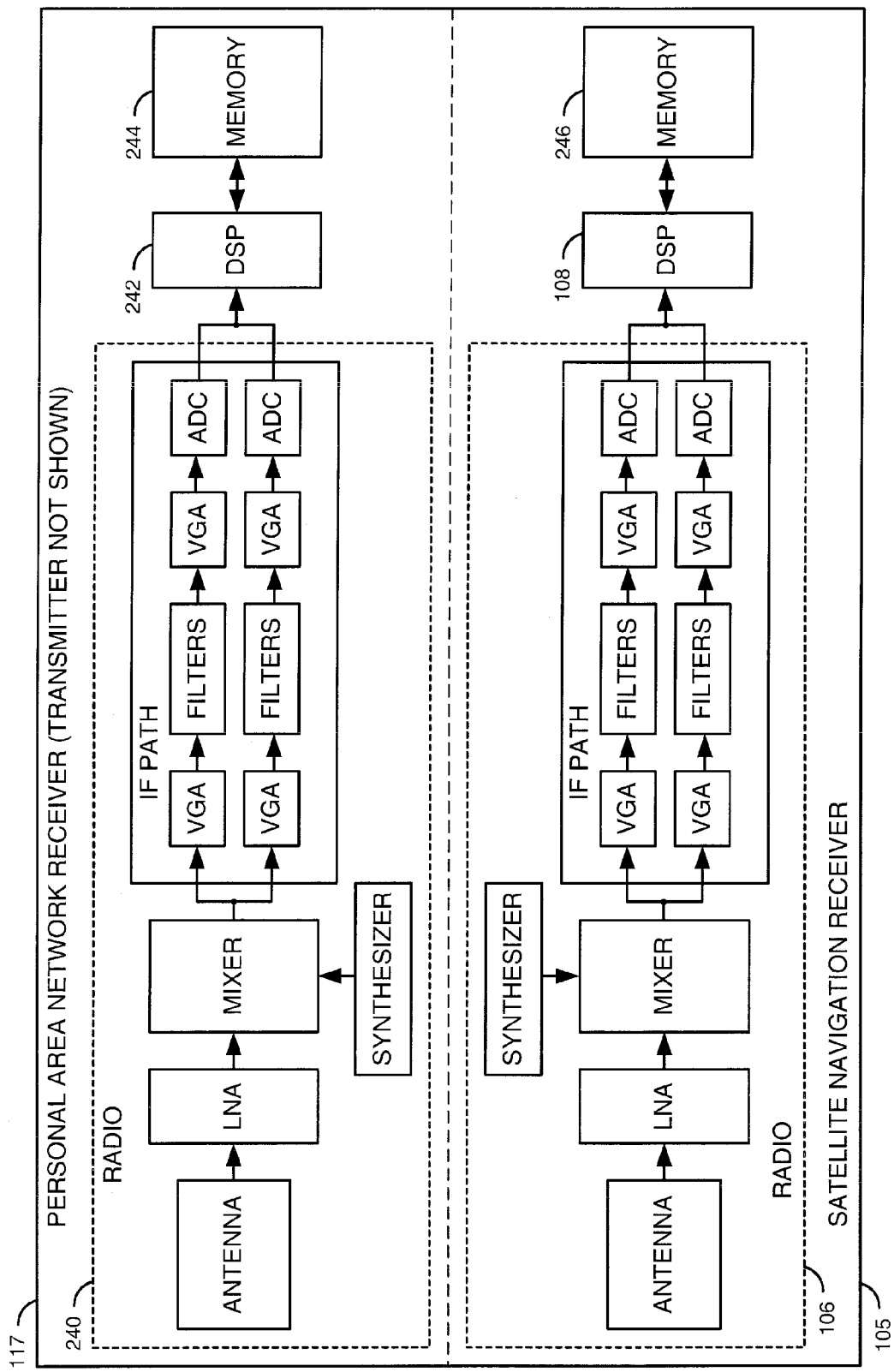
FIG. 8 is a partial block diagram of a first example configuration of the headset.

Referring to FIG. 8, a partial block diagram of a first example configuration of a device 104a is shown. The figure generally illustrates part of the circuit 117 and part of the circuit 105. The circuit 117 and the circuit 105 generally comprise many common and/or similar functions. The circuit 117 generally comprises a radio 240 (providing both a transmit function and a receive function), digital signal processing 242 (both hardware and software) and memory 244. The circuit 105 generally comprises the circuit 106 (providing a receive function), digital signal processing 108 (both hardware and software) and memory 246. Therefore, opportunities may exist to optimize the hardware within the device 104a. For example, the performance of a receive path within the circuit 240 may be enhanced to provide a portion of a satellite navigation receiver capability.

The circuit 240 generally comprises an antenna, a low noise amplifier (LNA), a mixer, a frequency synthesizer and an intermediate frequency (IF) path. The IF path of the circuit 240 generally comprises multiple variable gain amplifiers (VGA), multiple filters and multiple analog-to-digital converters (ADC). Likewise, the circuit 106 generally comprises an antenna, a low noise amplifier, a mixer, a frequency synthesizer and an IF path. The IF path of the circuit 106 generally comprises multiple variable gain amplifiers, multiple filters and multiple analog-to-digital converters.

Figure 9:
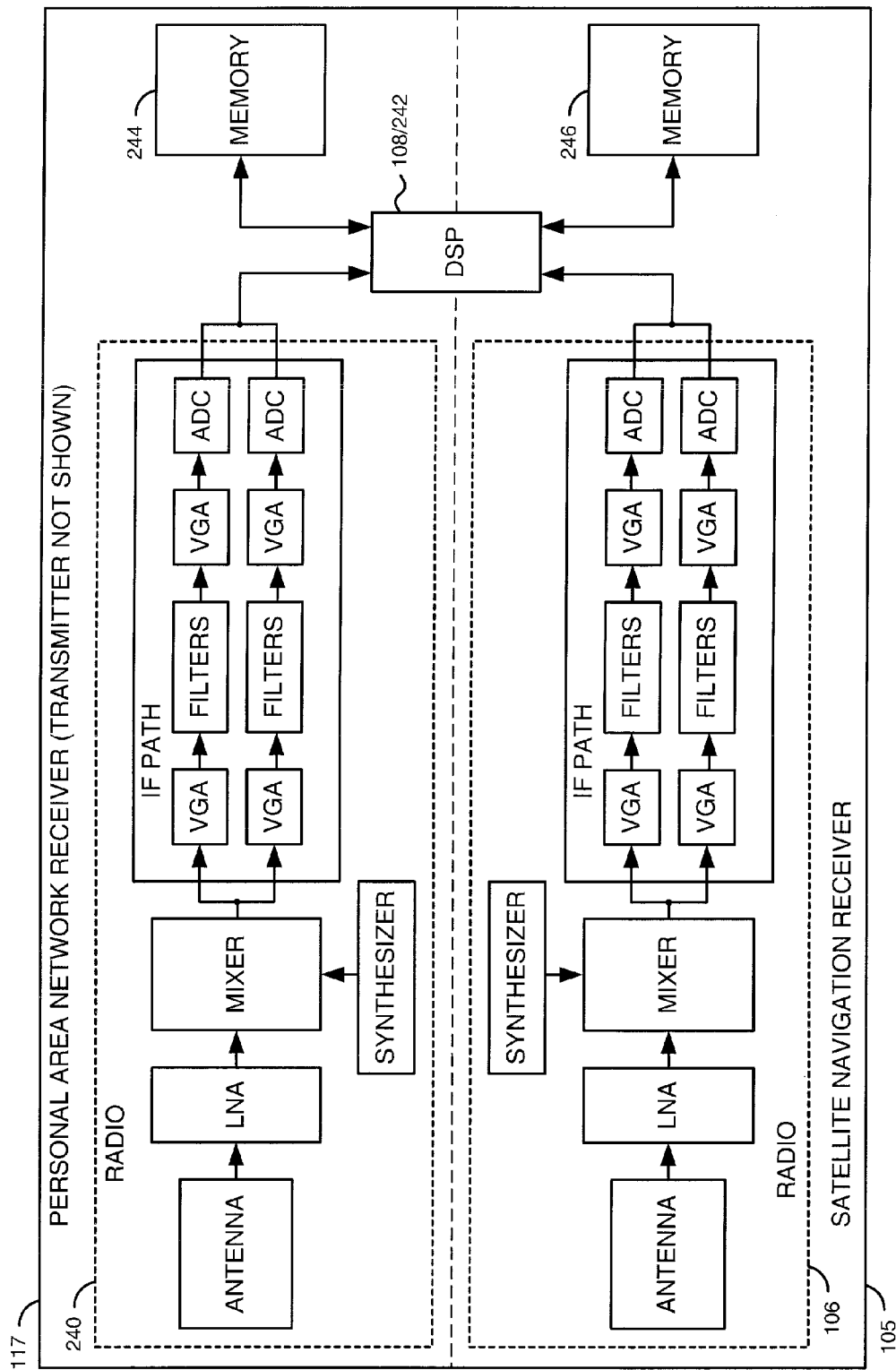
FIG. 9 is a partial block diagram of a second example configuration of the headset.

Referring to FIG. 9, a partial block diagram of a second example configuration of a device 104a is shown. In the second configuration, one or more common DSPs (and/or CPUs) may be shared between the satellite navigation receiver 105 and the personal area network transceiver 117.

Figure 10:
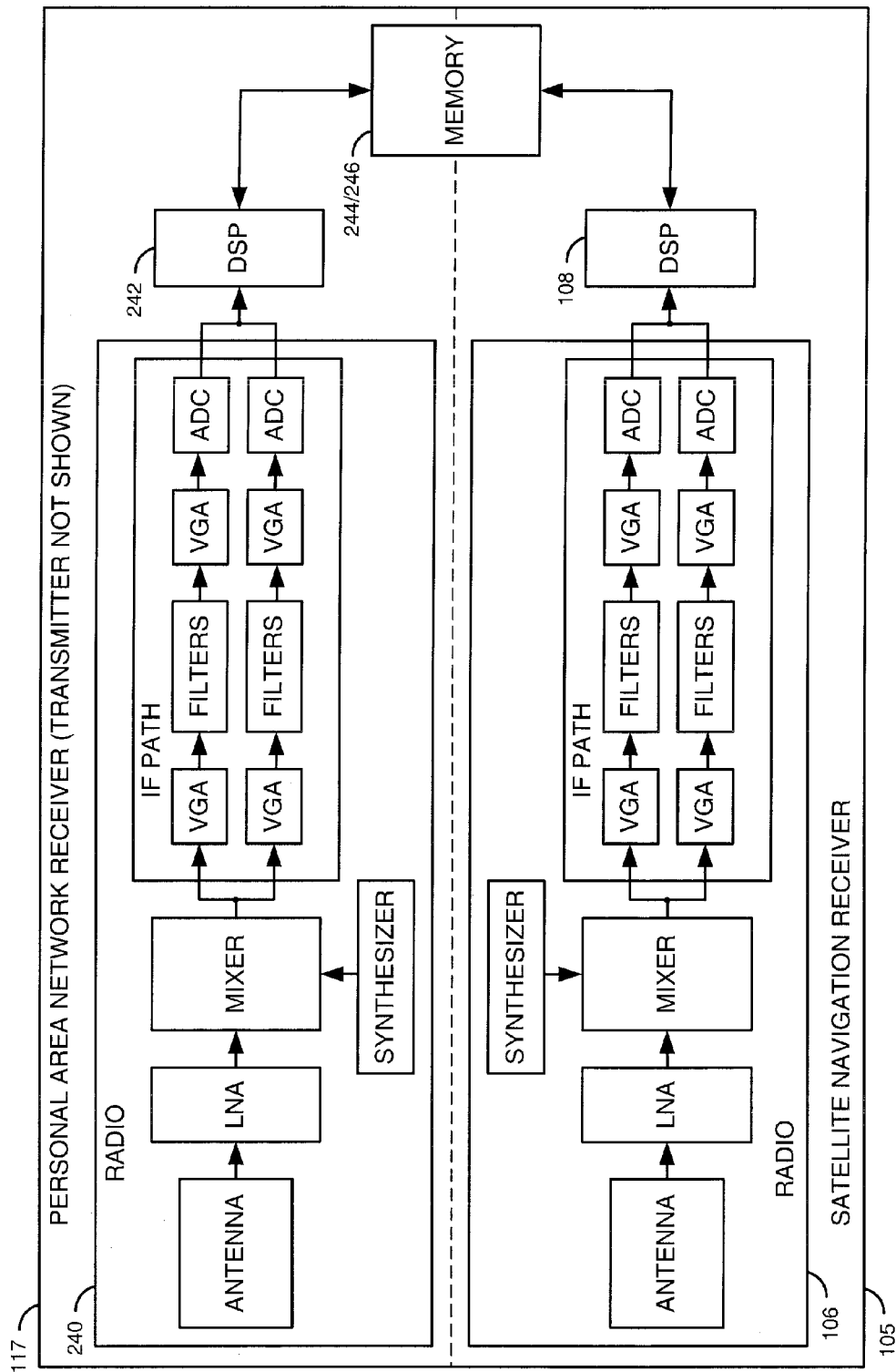
FIG. 10 is a partial block diagram of a third example configuration of the headset.

Referring to FIG. 10, a partial block diagram of a third example configuration of a device 104a is shown. In the third configuration, one or more common memory modules may be shared between the satellite navigation receiver 105 and the personal area network transceiver 117.

Figure 11:
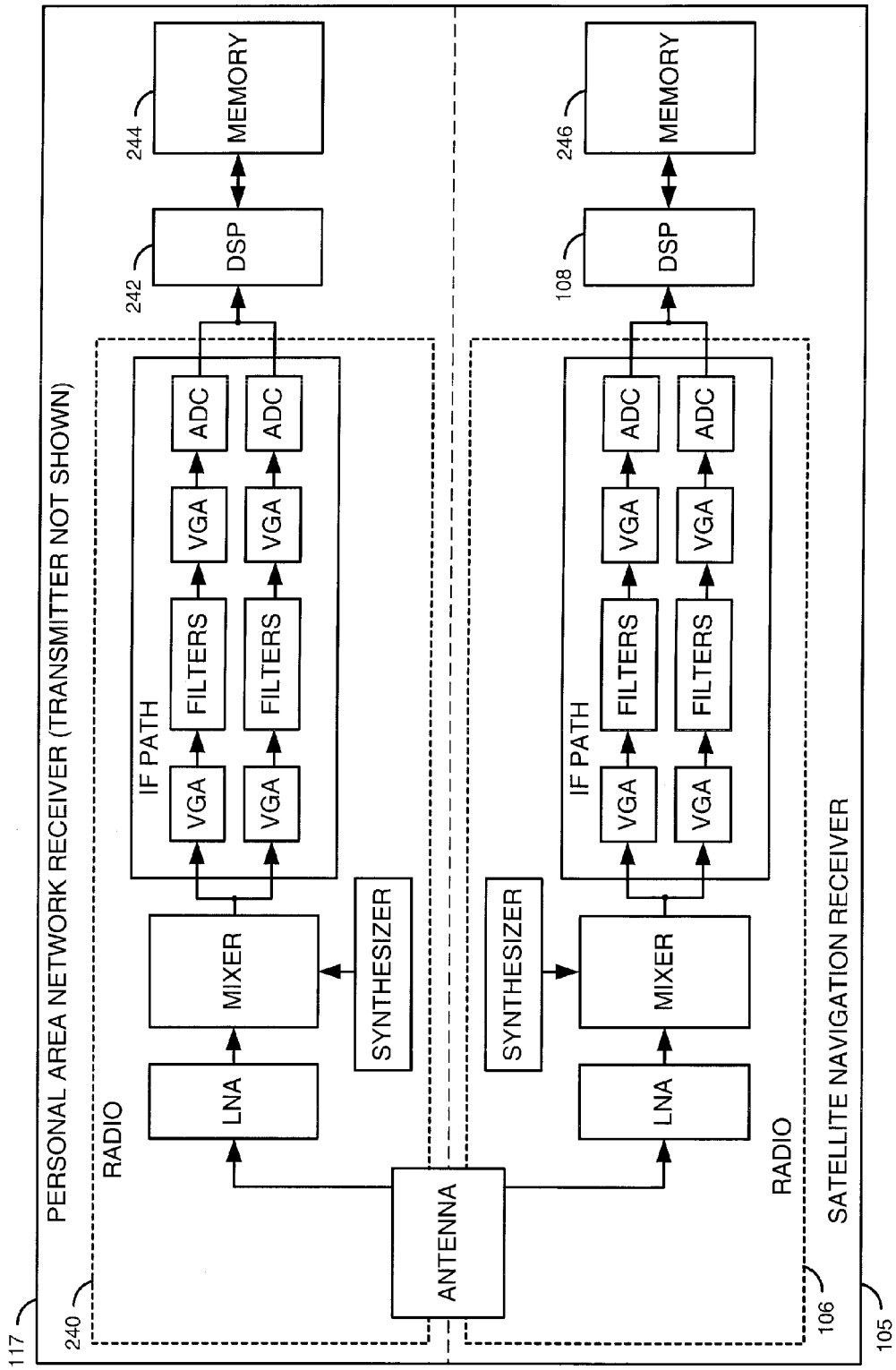
FIG. 11 is a partial block diagram of a fourth example configuration of the headset.

Referring to FIG. 11, a partial block diagram of a fourth example configuration of a device 104a is shown. A single antenna may be shared between the radio 106 and the radio 240.

Figure 12:
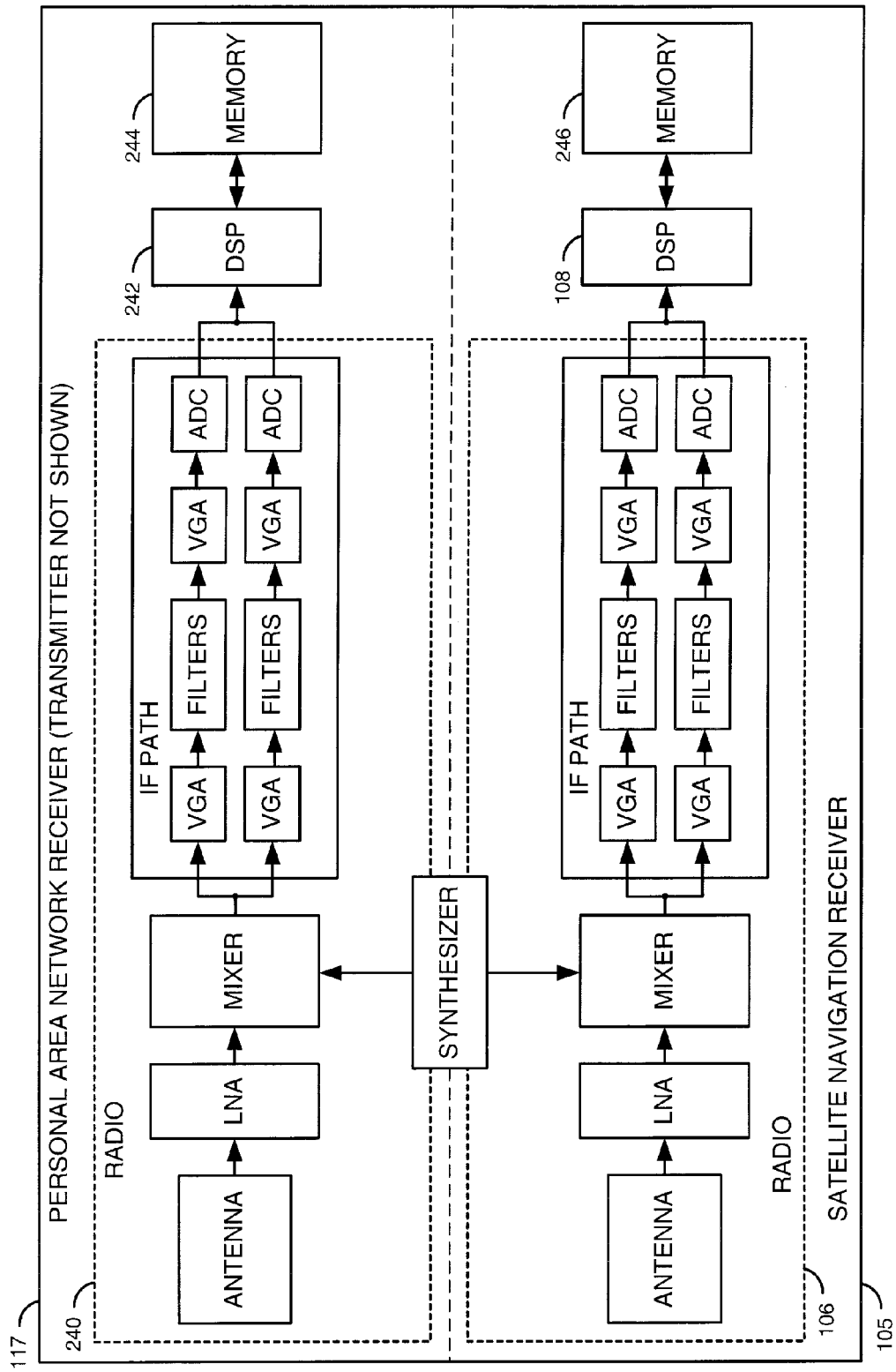
FIG. 12 is a partial block diagram of a fifth example configuration of the headset.

Referring to FIG. 12, a partial block diagram of a fifth example configuration of a device 104a is shown. The frequency synthesizer may be shared between the radio 106 and the radio 240. The fifth configuration may be efficient where locally generated frequencies used in the radio 106 may be integer multiples and/or integer fractions of the frequencies used in the radio 240.

Figure 13:
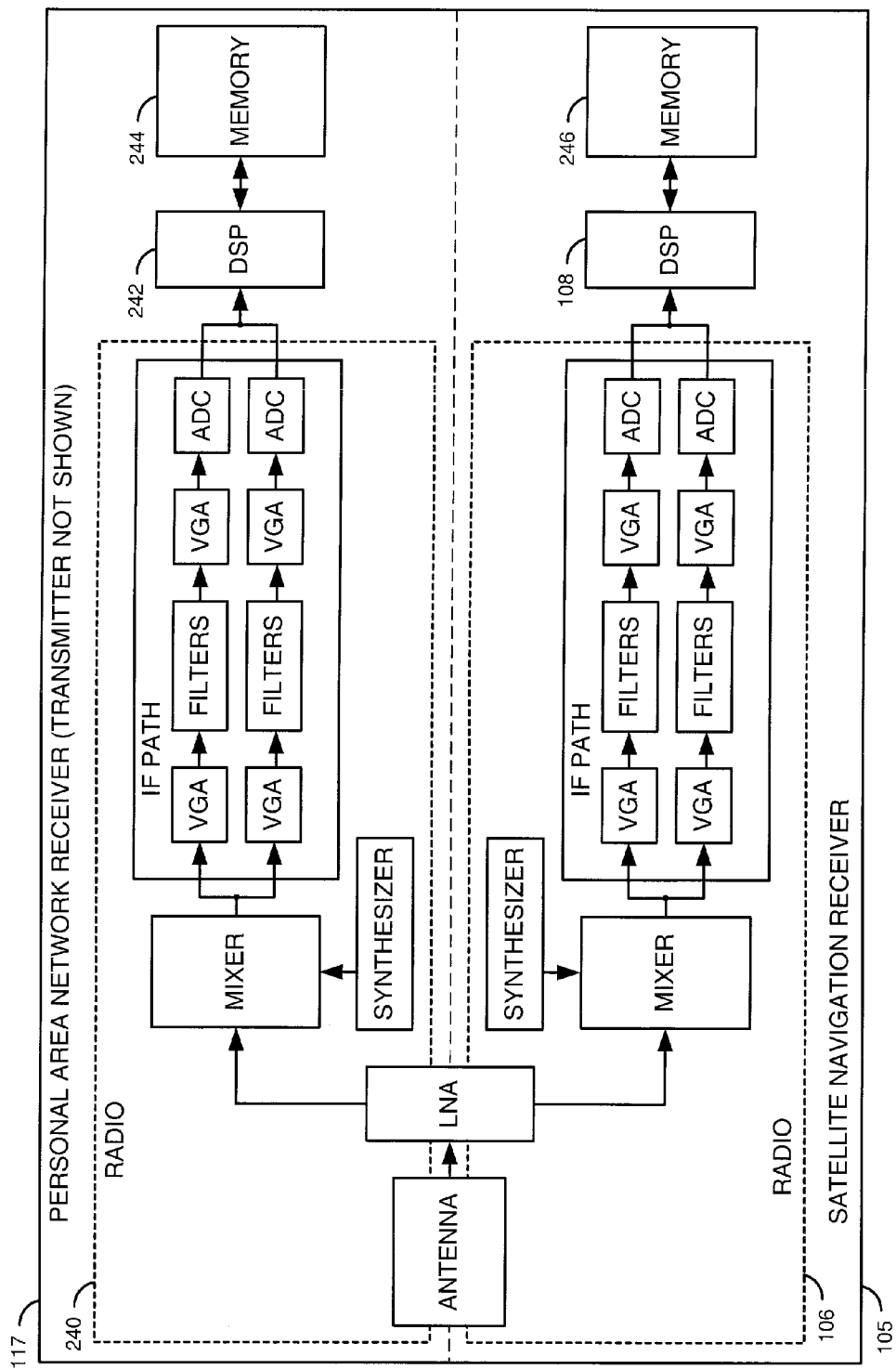
FIG. 13 is a partial block diagram of a sixth example configuration of the headset.

Referring to FIG. 13, a partial block diagram of a sixth example configuration of a device 104a is shown. A common antenna and a common low noise amplifier may be shared between the radio 106 and the radio 240.

Figure 14:
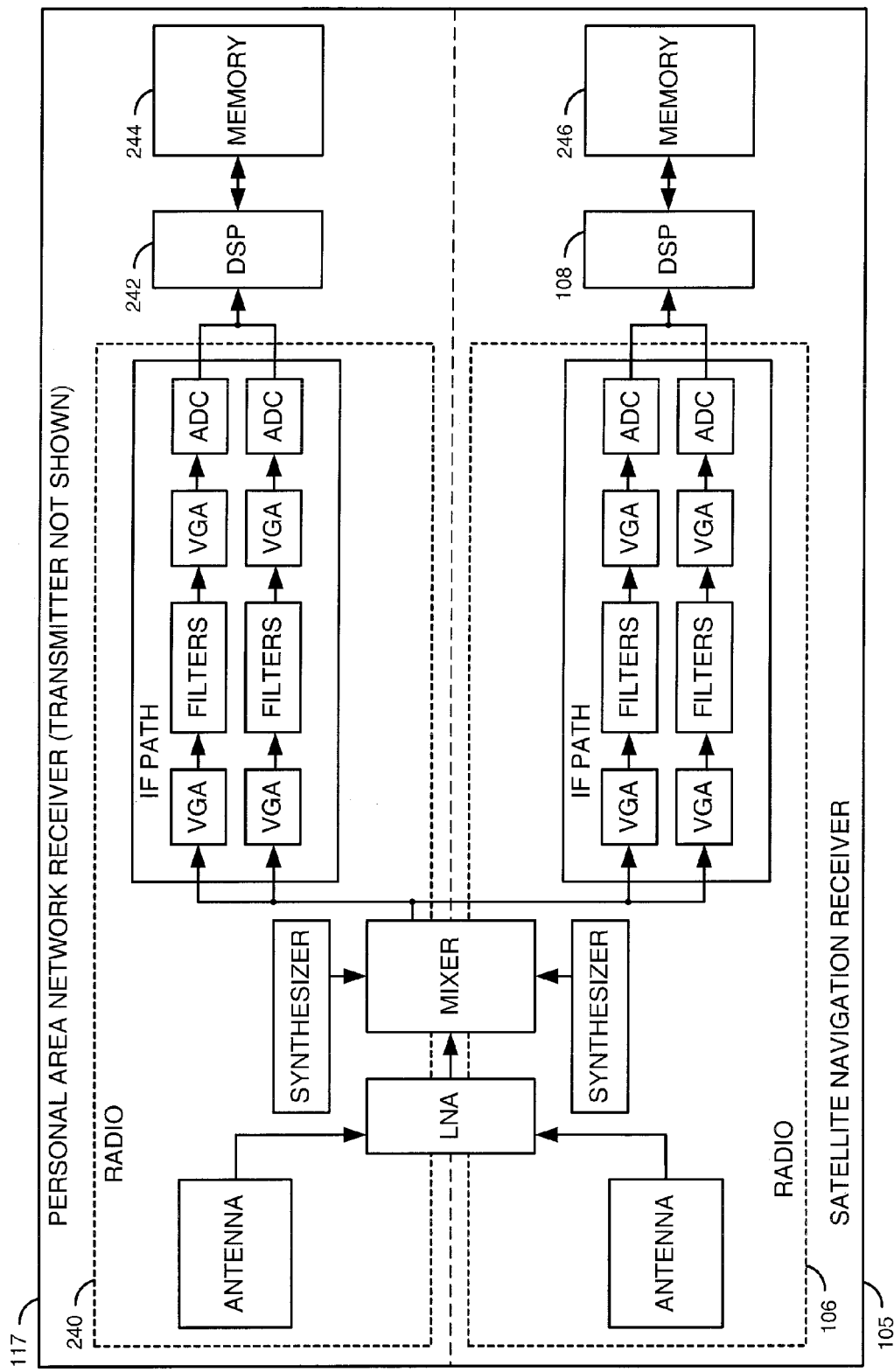
FIG. 14 is a partial block diagram of a seventh example configuration of the headset.

Referring to FIG. 14, a partial block diagram of seventh example configuration of a device 104a is shown. The common low noise amplifier and a common mixer may be shared between the radio 106 and the radio 240 while the two radios operate in a time-sliced manner.

Figure 15:
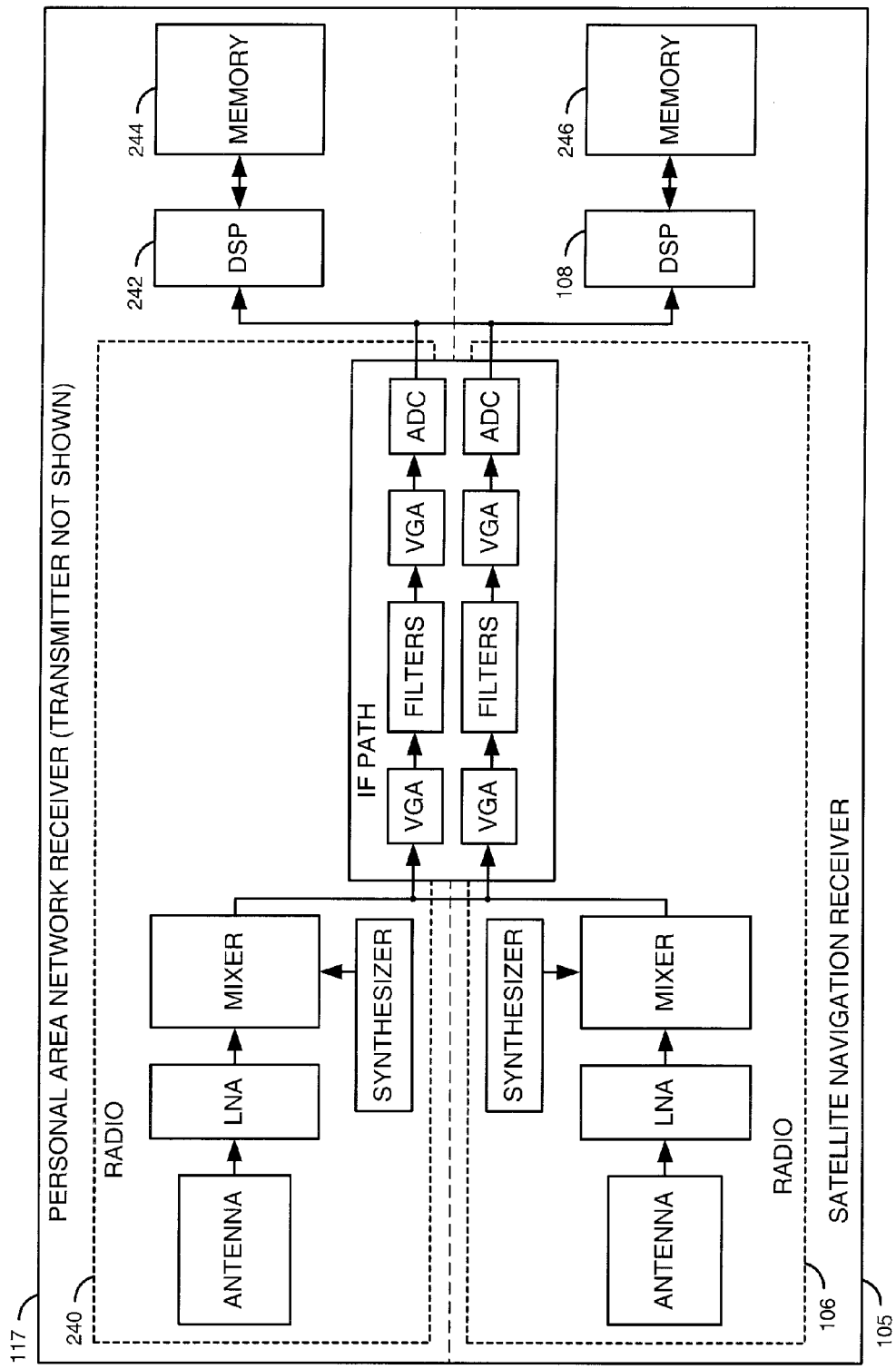
FIG. 15 is a partial block diagram of an eighth example configuration of the headset.

Referring to FIG. 15, a partial block diagram of an eighth example configuration of a device 104a is shown. If operations of the radio 106 and the radio 240 may be time-sliced, the IF signal path could be shared between the two solutions where the gain levels, gain distribution, filtering criteria and filter pass-bands/stop-bands may be configured accordingly. Other shared-module configurations may be implemented to meet the criteria of a particular application.

Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of enabling navigation from a headset, comprising the steps of:
(A) receiving a first signal transmitted by a device to said headset through a wireless personal area network, said first signal carrying assist data transmitted by an Assisted Global Positioning System server;
(B) receiving a plurality of navigation signals transmitted by a navigation system to said headset; and
(C) calculating a current position of said headset at a first time using said assist data to lock onto said navigation signals.

2. The method according to claim 1, further comprising the steps of:
transmitting a second signal carrying said current position from said headset through said personal area network to said device; and
utilizing said current position in a location-based service operating in said device.

3. The method according to claim 1, further comprising the step of:
receiving a request signal transmitted by said device through said personal area network to said headset at a second time; and
extrapolating said current position at said second time in said headset.

4. The method according of claim 1, further comprising the steps of:
repeatedly calculating said current position of said headset based on said navigation signals; and
reducing a tracking power consumption of a tracking operation in said headset between said calculations, wherein said tracking operation locks onto said navigation signals while normally powered.

5. The method according to claim 4, further comprising the step of:
maintaining a position power consumption of a position operation in said headset while reducing said tracking power consumption, wherein said position operation (i) calculates said current position based on a plurality of pseudoranges received from said tracking operation when available and (ii) estimates said current position while said tracking power consumption is reduced.

6. A headset comprising:
a network circuit configured to receive a first signal transmitted by a device through a wireless personal area network, said first signal carrying assist data transmitted by an Assisted Global Positioning System server; and
a navigation circuit configured to (i) receive a plurality of navigation signals transmitted by a navigation system and (ii) calculate a current position of said headset at a first time using said assist data to lock onto said navigation signals.

7. The headset according to claim 6, wherein (i) said network circuit is further configured to receive a request signal transmitted by said device through said personal area network at a second time and (ii) said navigation circuit is further configured to extrapolate said current position at said second time.

8. The headset according to claim 6, wherein said navigation circuit comprises:
a tracking module configured to repeatedly calculate a plurality of pseudoranges based on said navigation signals; and
a power module configured to power down said tracking module between said calculations.

9. The headset according to claim 6, wherein said network circuit and said receiver navigation circuit share at least one of (i) an antenna, (ii) a low noise amplifier, (iii) a frequency synthesizer, (iv) a processor, (v) a memory, (vi) a mixer and (vii) an intermediate frequency signal path.

10. The headset according to claim 6, wherein (i) said navigation system comprises a Global Positioning System, (ii) said personal area network comprises a Bluetooth network, (iii) said device comprises a cellular telephone and (iv) said headset comprises a two-way audio headset.

11. A method of enabling navigation in a headset, comprising the steps of:

(A) receiving a first signal carrying assist data transmitted by an Assisted Global Positioning System server through a cellular network to a device;
(B) transmitting a second signal carrying said assist data from said device to said headset through a personal area network;
(C) receiving a third signal carrying a current position transmitted by said headset through said personal area network to said device; and
(D) utilizing said current position in a location-based service operating in said device.

12. The method according to claim 11, further comprising the steps of:
receiving a plurality of navigation signals transmitted by a navigation system to said headset; and
calculating said current position of said headset using said assist data to lock onto said navigation signals.

13. The method according to claim 11, further comprising the step of:
transmitting a request signal at a particular time from said device through said personal area network to said headset in response to a location-based service operating in said device depending upon said current position.

14. The method according to claim 11, further comprising the steps of:
determining a coarse position of said device by utilizing said cellular network;
determining a current time at said device by utilizing said cellular network; and
incorporating both said coarse position and said current time into said assist data transmitted to said headset.

15. The method according to claim 11, wherein said assist data received by said device comprises (i) ephemeris data of a satellite navigation system and (ii) almanac data of said satellite navigation system.

16. A system comprising:
a receiver module in a device configured to receive a first signal carrying assist data transmitted by an Assisted Global Positioning System server through a cellular network to said device;
a network module in said device configured to transmit a second signal carrying said assist data from said device to a headset through a personal area network and (ii) receive a third signal carrying a current position transmitted by said headset through said personal area network to said device; and
a service module in said device configured to utilize said current position in a location-based service operating in said device.

17. The system according to claim 16, further comprising said headset configured to (i) receive a plurality of navigation signals transmitted by a navigation system and (ii) calculate said current position using said assist data to lock onto said navigation signals.

18. The system according to claim 17, wherein said headset comprises an antenna (i) suitable to receive said navigation signals and (ii) positioned to have at least a quarter-sphere field of view while being worn by a user.

19. The system according to claim 17, wherein said headset is configured to track said navigation signals while said device is powered down.

20. The system according to claim 17, wherein (i) said navigation system comprises a Global Positioning System, (ii) said personal area network comprises a Bluetooth network, (iii) said device comprises a cellular telephone and (iv) said headset comprises a two-way audio headset.

* * * * *